United States Patent [19]
Watkins et al.

[11] Patent Number: 4,947,072
[45] Date of Patent: Aug. 7, 1990

[54] STATOR WINDING FOR TWO-POLE DYNAMOELECTRIC INDUCTION MACHINES

[75] Inventors: William J. Watkins; Randal A. Oyster, both of Troy, Ohio

[73] Assignee: A.O. Smith Corporation, Milwaukee, Wis.

[21] Appl. No.: 260,595

[22] Filed: Oct. 21, 1988

[51] Int. Cl.⁵ .................. H02K 3/00; H02K 1/00; H02P 1/32
[52] U.S. Cl. .................................. 310/179; 310/180; 310/184; 318/771
[58] Field of Search ............... 310/179, 180, 184, 198, 310/206, 166, 167; 318/771, 773, 780

[56] References Cited

U.S. PATENT DOCUMENTS

| | | | |
|---|---|---|---|
| 1,849,519 | 5/1930 | Gay | 318/771 |
| 1,927,208 | 7/1931 | Gay | 318/771 |
| 2,182,646 | 7/1938 | Shutt | 318/771 |
| 3,408,571 | 10/1968 | Wilson | 325/145 |
| 3,413,717 | 12/1968 | Peters | 29/605 |
| 3,515,919 | 6/1970 | Houtman | 310/166 |
| 3,652,888 | 3/1972 | Harrington | 310/198 |
| 3,949,254 | 4/1976 | Woll et al. | 310/198 |
| 4,200,817 | 4/1980 | Bratoljic | 310/198 |
| 4,296,344 | 10/1981 | Rabe | 310/184 |
| 4,321,494 | 3/1982 | MacNab | 310/179 |
| 4,363,985 | 12/1982 | Matsuda | 310/206 |
| 4,394,596 | 7/1983 | Kimura et al. | 310/184 |
| 4,492,890 | 1/1985 | MacDonald | 310/184 |
| 4,495,430 | 1/1985 | Herr et al. | 310/198 |
| 4,675,591 | 6/1987 | Pleiss | 318/773 |

FOREIGN PATENT DOCUMENTS 719762 10/1965 Canada ................................. 310/198
758392 8/1980 U.S.S.R. ............................... 310/198

Primary Examiner—Patrick R. Salce
Assistant Examiner—C. E. LaBalle
Attorney, Agent, or Firm—Andrus, Sceales, Starke & Sawall

[57] ABSTRACT

A three phase two-pole induction motor includes a three phase winding wound as a two-pole winding with an effective full pitch wound winding connected in a double delta connection. Each pole group includes a plurality of coils wound as a concentric winding or as a short pitch lap wound equivalent winding. A 36 slot stator is illustrated and includes each phase winding wound with 2 coil units each having 2 coil groups. Each coil group has 3 concentric coils and in the illustrated concentric winding the one phase winding has one group with coil sides in slots 1-3 and 16-18 and the second group in slots 19-21 and 34-36. The next phase winding has similar coils in slots 4-6 and 25-27 and in slots 7-9 and 22-24. The third phase winding has similar coils in slots 10-12 and 31-33 and in slots 13-15 and 29-30. The coil sides of each of the two groups are connected to form a full pitch winding. Thus, coil sides in slots 1-19, in 7-25 and in 13-31 are connected to form an effective coil spanning a full pitch of 18 slots. The coil groups of different phase windings are connected in the double delta circuit connection including a series circuit connection for starting, and a parallel circuit connection for running. The simplified full pitch winding for the double delta motor winding connection allows the motor to accelerate to operating speed in the start winding connection and also reduces the starting current while minimizing side pull effects and the rate of temperature rise.

5 Claims, 2 Drawing Sheets

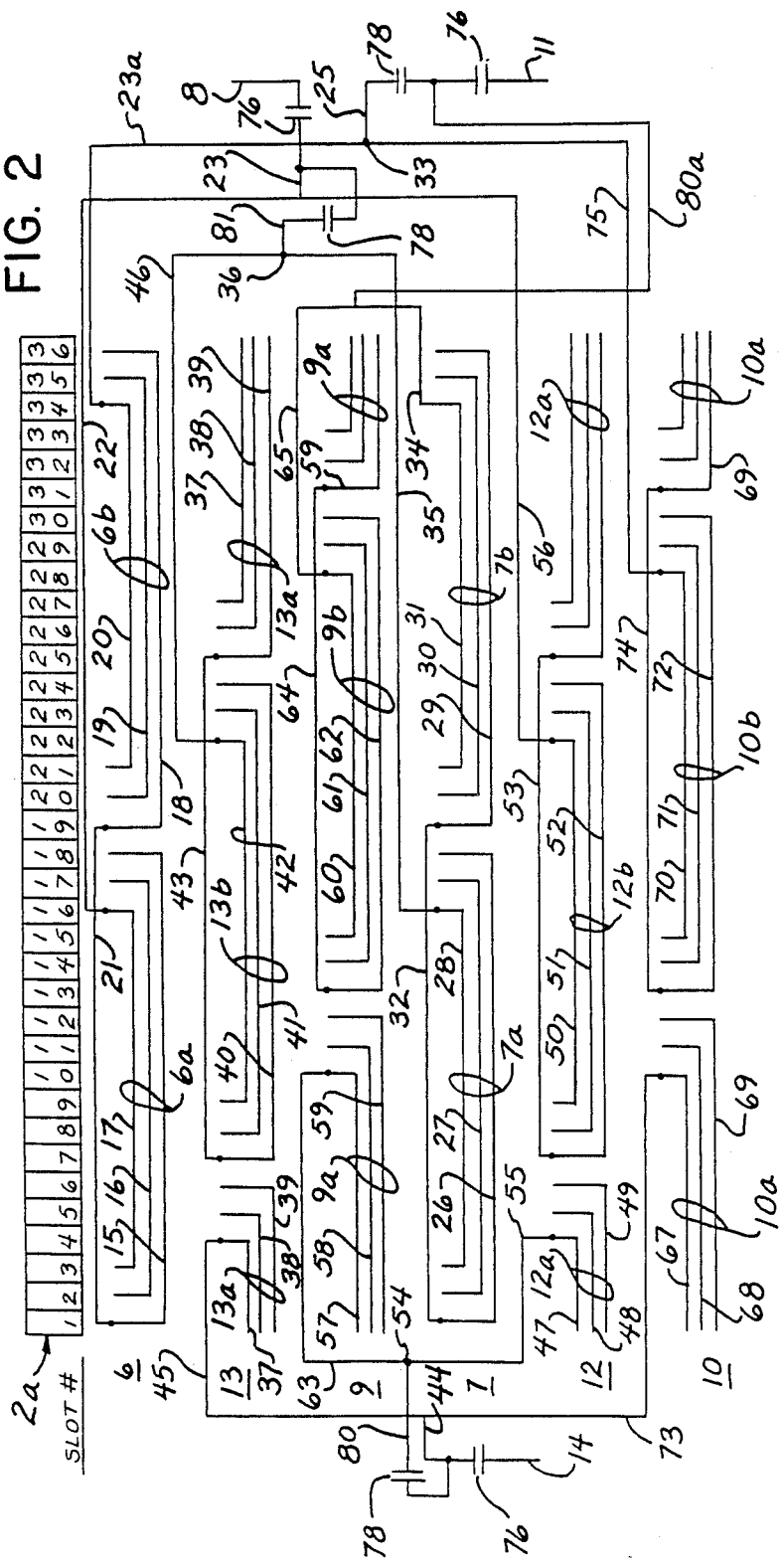

STATOR WINDING FOR TWO-POLE DYNAMOELECTRIC INDUCTION MACHINES

BACKGROUND OF THE PRESENT INVENTION

This invention relates to a two-pole stator winding for a dynamoelectric induction machine and particularly a polyphase induction motor.

Alternating current induction motors have been developed as suitable power driving sources. Polyphase motors and particularly three phase motors are widely applied in industrial and similar heavy duty applications. A rotor is rotatably mounted within an annular stator. The stator is wound with a three phase winding connected to a three phase alternating current power supply. The rotor is normally provided with a short circuited winding within which responds to the stator field to create an induced field. The power supply includes phase voltages and currents which are offset in time by a predetermined angular displacement. A three phase power supply has three voltages and currents which are offset from each other by 120 electrical degrees. In the three phase motor, three distinct phase windings are provided one for each power phase of the power supply. The three phase winding thereby develops a magnetic field which moves circumferentially about the stator and rotor. The induced field tends to align with and follow the rotating field to create a rotating force and motion of the rotor as a result of the electromagnetic coupling between the fields of the stator and the rotor. Each phase winding is conventionally formed of a plurality of individual coil groups, with each group of phase coils generally distributed as a part of the phase winding. In a two pole machine, coil pairs are provided circumferentially spaced from each other by 180 degrees. The coils are wound to form complementing poles spaced approximately 180 electrical degrees from each other.

The windings are wound of copper or other low resistance wire. When connected to the conventional three phase power supply, a high level current flows through the winding with the rotor stationary or rotating slowly. Under motor running operation, the current is limited by the electromagnetic coupling of the stator field and the induced field of the rotor in accordance with well known electromagnetic phenomenon. At and during the starting of the motor, the rotor is at an essential standstill and accelerates relatively slowly from standstill to the operating speed. During this short period of starting and acceleration, the winding is a low resistance wire load and high level currents would flow through the coils, in the absence of special compensation systems connected into the winding circuit. Although the current surges encountered may not seriously damage the motor, such surges are reflected by the power supply back to the system to which the motor is connected. An effect which is often encountered is a momentary dimming of lights connected to the same power supply system, and which is generally considered at best to be an undesired annoyance.

The prior art discloses various circuit connections to minimize and limit the starting current in order to minimize current surges on the supply.

Generally, the special winding connections are connected to a suitable switching circuit to limit the current, to operate the motor with special circuits operating at a relatively low efficiency until such time when the circuit is switched to establish the running circuit connection.

A highly satisfactory induction motor employs a stator winding of a double-delta connected configuration. In the double delta winding circuit, the three phase windings are interconnected to form an equi-triangle with a phase winding in each leg. The power supply is connected to the apexes or points of the triangle. In the double delta circuit connection, coil pairs in each leg are connected in parallel for generating the corresponding north and south poles. A conventional manner of limiting the current during starting is to reconfigure the phase winding during starting with the pairs of windings of each phase connected in a series circuit with each other and with the winding of another phase. It is well known that when a normal phase relationship between the current in the several windings is disrupted that the voltage is reduced on all coils. Thus, the impedance, that is, the resistance to alternating current flow of the stator winding, is much higher and significantly minimizes the starting current surges.

U.S. Pat. No. 4,675,591 to Bernard J. Pleiss and assigned to a common assignee with this application, for example discloses a special four-pole (or multiples thereof) motor with a special bi-filer chain wound winding with the phase windings connected in a delta circuit. The Pleiss patent discloses the special chain winding concentrically wound for winding a machine with four poles and higher multiplexes of four poles. The special two layer chain winding provides ease of winding and assembly. To start the motor, the winding is connected in a series delta circuit connection and switched to a parallel delta circuit for running.

Although relatively widely used and a highly satisfactory circuit, the conventional two pole motor will not reach operating speed in the start circuit connection. Although other winding configurations may reach operating speed, such alternate configurations are complex or do not provide an adequate reduction or limit on the starting current.

In a typical polyphase or two pole, three phase motor, the stator is formed with a substantial plurality of circumferentially spaced winding slots. Each coil of the coil pair of a phase winding includes a plurality of coils. The coils are generally prewound with the sides of different circumferential spacing generally by and differing by a coil slot, such that a given phase winding consists of a plurality of immediately adjacent individual coils interconnected at the opposite axial ends to form a series of coils for establishing the corresponding plurality or pole. In a conventional winding practice, each slot will include the sides of different phase coils to permit the compact and appropriate locations of the poles to establish the interaction between the stator phase windings and the field of the rotor.

For example, U.S. Pat. No. 4,492,890 discloses a stator winding configuration for controlling the current flow and magnetic field created by the coils. It is specially constructed to provide a high efficiency operation. That patent discloses a method of special coil distribution within the slots to effect the improvement in motor operation. As more fully discussed therein, the chordal effect of the coil configurations will modify the harmonic content to establish and maintain a highly efficient motor operation. Such a solution however requires a special coil with special orientation and insertion into the coil slots.

In a conventional practice, the preformed coils are hand placed in the slots or placed on a supporting fixture which is introduced into the stator and expanded outwardly to place the windings into the appropriate slots. The use of the different number of turns of the coil and the modified distribution of the coil sides, such as typical of the U.S. Pat. No. 4,492,890, may require special attention and consideration in forming of the stator. Further, it is not clear that the motor will start even with such winding distribution and particularly reach operating speed under the starting circuit connection.

There is therefore a need for a winding configuration and system and particularly in a two pole motor which will cause the motor to accelerate to operating speed on the start winding circuit connection with a significant reduction in locked rotor current to prevent severe current surges on the power supply and permit switching only after or essentially reaching operating speed.

SUMMARY OF THE PRESENT INVENTION

Generally in accordance with the present invention, a special polyphase stator winding configuration for a two pole stator is wound within the stator establishing essentially full operating motor speed on the starting connection with limited starting current flow. The motor can then be switched to the run connection without creating a surge in the motor or noticeable change in the power supply voltage. The present invention will also reduce the side pull effect encountered in various specially wound induction motors and further minimize the rate of temperature rise of the motor under normal starting conditions.

Generally, in accordance with the present invention, the polyphase winding is wound as a two pole motor winding with an essentially full pitch winding and with the winding wound for connection in a double delta connection. Switching means are interconnected between the power supply connections and the winding to connect the phase windings in a series delta circuit connection for starting and a parallel delta circuit for running. The winding can be wound in the two pole winding using known winding methods wherein the coil sides are located in the appropriate slots to provide an effective full pitch winding of a two pole construction and adapted to be switched to provide the double delta connection.

A full pitch lap winding may be used. Alternatively, a concentric winding configuration can be used wherein the concentric windings are not quite wound with a full pitch. The coils are not lapped but concentrically wound and each coil group is pitched slightly less than full pitch. The winding connection however provides essentially the identical result as a full pitch winding and is an effective full pitch winding. The reduced pitch winding is somewhat simpler and requires less material in the end turns while producing acceleration to operating speed under the starting circuit connection. The coils of a concentric winding can alternatively be wound in a lap wound equivalent.

Although the essentially full pitch winding is preferred, the pitch can be reduced slightly as by one slot. The motor acceleration operates with a rather significant dip in the speed-torque curve and with the magnitude of the dip becoming more significant as the pitch is reduced. The inventors' analysis indicates that the harmonics created with a reduction in the pitch create the dip in the curve in the two pole motor winding at four pole speeds. Thus, optimum operation and results are obtained using the full pitch winding in accordance with the preferred teaching of the present invention.

As previously noted, the present invention will also minimize side pull effects. This occurs because all coils of a double delta circuit are energized and with the effective full pitch connection of the windings establishes a balanced reaction on the rotor. Although not critical in all applications, the side pull effect is of substantial significance, especially in those applications in which the rotor is mounted on a cantilevered shaft. Various hermetic motor applications for refrigeration systems and the like are typical applications in which the side pull effect is of substantial significance.

Further, the winding of the present invention has been found to significantly minimize the rate of temperature rise in the motor and results in improved protection of the motor.

The present invention thus provides a motor construction with maximum ease of manufacture for motor performance at least equal to existing motor design and in certain respects superior. Thus, using the effective full pitch winding for a double delta motor connection will significantly reduce the start winding current and the side pull effects encountered during motor operation. The system also allows the motor to accelerate to operating speed in the start winding connection to eliminate current surges such that when the delta running mode is established, the starting of the motor does not affect the power supply system and cause dimming of lights or otherwise affect other loads on the power supply system.

BRIEF DESCRIPTION OF THE DRAWINGS

The drawings furnished herewith generally illustrate the best mode presently contemplated for the invention and are described hereinafter.

In the drawings:

FIG. 2 is a winding slot diagram illustrating an embodiment of the invention.

DESCRIPTION OF THE ILLUSTRATED EMBODIMENT

Figure 1:
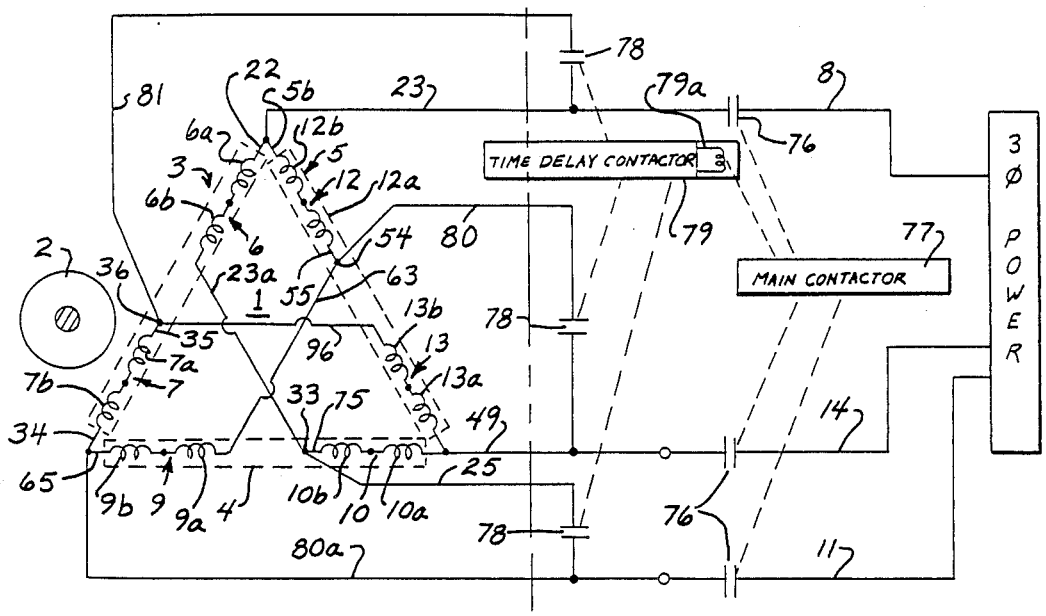
FIG. 1 is a schematic circuit illustration showing a three phase winding connection to an incoming power supply for energizing of the stator winding during the starting cycle, and switching to a parallel delta circuit for running.

Referring to the drawings and particular to FIG. 1, a stator winding for a three phase motor is illustrated.

The illustrated motor may typically be an AC induction motor having an annular stator winding 1, wound in an equal number of equi-circumferentially spaced slots and connected to a conventional three phase power supply. A rotor 2 having a short circuited winding, not shown, is rotatably mounted within the stator and responds to the energization of the stator winding 1. In accordance with the illustrated embodiment of the invention, the winding 1 is specially wound to permit starting of the motor to operating speed under a start circuit connection. The winding 1 is shown in a developed view of the stator slots diagrammatically shown as at 2a and numbered from 1 to 36 in FIG. 2, with the position of the illustrated coil sides for the three phase winding of a three phase motor aligned with the slots. The winding is illustrated as a concentric winding for a two pole motor. The winding is schematically shown in FIG. 1 as a delta connected winding including three phase windings 3, 4 and 5 each of which includes a plurality of coil units which are selectively connected in a series delta starting circuit or in a parallel delta running circuit, as more fully developed hereinafter.

Each phase winding in particular includes first and second coil units. Each of the units includes a pair of coil groups for establishing a two pole motor. The first phase winding 3 shown to the left side of the delta winding in FIG. 1 includes a first coil unit 6 and a second coil unit 7 selectively connected in the circuit to supply lines 8 and 11. The second phase winding 4 includes similar sets of coil units 9 and 10 connected to supply lines 11 and 14. Finally, the third phase winding 5 includes its corresponding sets of coil units 12 and 13 similarly interconnected to incoming power lines 14 and 8. Each of the coil units includes coil groups which are identified by the unit numbers and distinguished by the letters a and b respectively. The circuit connections are more fully described hereinafter.

Referring particularly to FIG. 2, the several coil groups are diagrammatically shown wound in winding slots 1–36 of the stator with an effective full pitch.

Particularly referring to the winding diagram shown in FIG. 2, the first phase winding 3 is shown with its coil units 6 and 7 similarly wound in the stator slots, with the coil group 6a and 7a in slots 1–18 and coils 6b and 7b in slots 19–36. Each coil group includes three individual coils which differ in width by two slots to fit into adjacent slots, as follows. Referring to coil group 6a, the largest or maximum pitch coil 15 has its sides located in slots 1 and 18. The second coil 16 of group 6a is located within the coil 15 and its coil sides are located in slots 2 and 17. Similarly, the smallest coil 17 of group 6b has its sides located in slots 3 and 16. Coil group 6b is similarly wound in slots 19–36, with the coil 18 in 19–36, coil 19 in slots 20 and 35 and coil 20 in slots 21 and 34, respectively. The two coil groups 6a and 6b are connected in series with each other. Thus, the coil sides located in slots 1 and 19 are connected by a jumper or connecting lead 21. The innermost coil 17 of the first group 6a is connected via a lead 22 to the incoming power connecting termination 23. The inner coil 20 of the second group 6b is connected by a connecting lead 23a to switching point or node 33 for interconnection to power supply and the other windings as shown in FIG. 1 and hereinafter discussed.

The second coil unit 7 for the corresponding first phase is wound with the coil groups 7a and 7b similarly located in the corresponding slots 1–18 and 9–36. Thus, group 7a includes coils 26, 27 and 28 in the respective slots 1–18, 2–17 and 3–16. Similarly, group 7b including coils 29, 30 and 31 in the respective slots 19–36, 20–35 and 21–34. Groups 7a and 7b are also connected in series with each other. The coil sides in slots 1 and 19 are connected by a lead 32. The second coil unit 7 has the smallest coil 31 of group 7b connected to the second phase power termination 80a via a lead 34 and the smallest coil 28 of group 7a connected by lead 35 to the switching point or node 36.

The concentric wound coils in the related groups 6a and 6b of coil unit 6 and groups 7a and 7b of coil unit 7 are each slightly less than full pitch windings, but in the operating connection are effectively full pitch windings. Thus, referring to the left side of coil 15 as viewed in FIG. 2, and the corresponding left side of coil 18, the coil sides are located in slots 1 and 19 and interconnecting and thus define an effective or operative full pitch coil. Although wound as different coils, the current in the coil sides of slots 1 and 19 establish a magnetic field corresponding to a full pitch wound coil. Thus, the inventor based on the realization that the coil sides are the effective source of the stator field and that by the appropriate winding, the concentric wound coils provide the effect of a full pitch winding, while permitting a less costly and more efficient manufacture and assembly of the stator. In summary, the sides of the several concentric coils as shown in FIG. 2 provide the same interaction as described above and produce an effective full pitch wound stator. As more fully described hereinafter, the stator winding can be operated in the conventional double delta winding connections during starting and running. In the starting connection, the series connected windings limit the current surges during standstill and low speed. However, the inventors have found that the start connection can be maintained until full operating speed is reached, and the winding then switched to the run connection, as by a time delay relay or other suitable system. The illustrated switching system is similar to that shown in the previously identified U.S. Patent to Pleiss.

The phase winding 5 consisting of the first and second coil groups 12 and 13 are similarly disposed in corresponding slots as shown in FIG. 2. The coil group 13a has an inner small coil 37 with its sides located in slots 4 and 27, an intermediate coil 38 with its sides located in slots 5 and 26 and the large coil 39 with its sides located in slots 6 and 25. The coil group 13b of coil unit 13 has the larger coil 40 with sides located in slots 7 and 24, the intermediate coil 41 with its sides in slots 8 and 23 and the smallest coil 42 having its sides in slots 9 and 22. The coil side in slot 7 and the coil side in slot 25 are connected by lead 43 to provide the series connection of the coil pair. The small coil 37 of the coil group 13a is connected to the third phase line termination 44 via a connecting lead 45. The corresponding coil 42 in the coil group 13b is connected to the switching point or node 36 via the connecting lead 46.

The second coil group 12 has coils 12a and 12b located in the identical slots with coil unit 13 and particularly coils 13a and 13b. Coil 12a has its three coils 47, 48 and 49 with one side in slots 4, 5 and 6 and the second side in slots 25, 26 and 27. The coil 12b has its three coils 50, 51 and 52 with one side in slots 7, 8 and 9 and the second side in slots 22, 23 and 24. The coil side of coil 52 in slot 7 is connected by lead 53 to the corresponding coil side of coil 49 in slot 25 and thus establish a full pitch coil effectively. The coil 47 has its coil side in slot 4 connected to the switching point or node 54 by a lead 55 and the coil 50 has its coil side in slot 22 connected to the first phase line termination 23 by lead 56 to complete the connection of the winding 5 as shown in FIG. 1.

Final phase winding 4 is correspondingly connected in proper angular displacement to windings 3 and 5 to generate the displaced rotating stator field. The first coil unit 9 includes groups 9a and 9b. The three coils 57, 58 and 59 of group 9a have coil sides located in slots 10, 11 and 12 and second coil sides in slots 31, 32 and 33 respectively. The second coil group 9b has three coils 60, 61 and 62 with the first coil sides located in slots 13, 14 and 15 and the second coil sides located in slots 28, 29 and 30 respectively. The small coil 57 of group 9a is connected by connecting lead 63 to the switching node 54. The inner ends of the large coil 59 and 62 are connected by a jumper lead 64. The small coil 60 of the group 9b is connected by a lead 65 to the phase line termination 80a.

The second coil unit 10 for winding 4 is similarly wound and with the coil sides located in the same coil slots as the corresponding coil groups of coil unit 9. Coil group 10a has its three coils 67, 68 and 69 with the first sides in slots 10, 11 and 12 and the second sides in slots 31, 32 and 33. The second coil group 10b has its three coils 70, 71 and 72 with first coil sides in slots 13, 14 and 15 and second coil sides in slots 28, 29 and 30. The one end of the coil 67 is connected via a connecting lead 73 to the line termination 44. The internal jumper lead 74 connects the corresponding sides in slots 13 and 31 of the coils 69 and 72 to establish the effective full pitch winding. Coil 70 of group 10b is connected to switching point or node 33 via a lead 75 to complete the connection of winding 4.

Each phase winding of the three phase winding is wound as a two pole winding and includes the two coil units consisting of two coil groups connected in series and connected to the switching nodes and to the line termination for connecting to the incoming power supply line, as shown in FIG. 1.

The incoming power line terminations 23, 44 and 80a are connected to the power supply line 8, 11 and 14 in series with normally open contacts 76 of a main contactor 77. In addition, the switching points or nodes 33, 36 and 54 are connected to the power supply line terminations and more particularly between the respective line to power line terminations in series with normally open contacts 78 of a switching timed contactor 79. Thus, the connecting line 22 which is connected between the phase winding 3 and the corresponding coil unit of the phase winding 5 via lead 56 is connected directly to the first power connecting termination 23. Switching node or connection 54 which is connected to the coil unit groups 9a of the phase winding 4 and the coil unit group 12a of the phase winding 5 is also connected in series with contacts 78 of the contactor 79 to connection of line termination 44 via a line 80 to contact 76 and thereby to supply line 14. Node 33 which is connected between the coil unit 6b of the phase winding 3 and the coil unit 10b of the phase winding 4 is connected to the phase power supply line 11 via a lead 25 and normally open contactor 78 of contactor 79 in the line termination 80a. Finally, node 36, which is connected to coil unit 13b of phase winding 5 and to coil unit 7a of phase winding 3 is connected to the power supply line 8 via normally open contacts 78 of contractor 79 via a lead to the connection of main contacts 76 and its connection to line termination 23.

In starting of the motor, the contacts 76 are closed, with the contacts 78 held open. The motor is then energized in accordance with a conventional series connection of the various coil units and in a manner to limit the current flow through the stator winding. Thus, the first coil unit 6 of the phase winding 3 is connected in series with the coil unit 10 of the phase winding 4. The second coil unit 7 of the phase 3 is connected in series with the coil unit 13 of the phase winding 5 between supply lines 11 and 14. The other coil units are similarly connected with the coil units of one phase connected with a coil unit of a different phase to create the start connection for a double delta winding and thus provides the desirable limit current control In the present invention, the start circuit connection is maintained for a time period during which the motor reaches operating speed, at which time the contacts 78 are closed. The closing of contacts 78 automatically switches from the series delta start connection to the parallel delta run connection, with the coil units of each phase connected in parallel with each other to the respective power lines.

The contactor 79 includes and is typically actuated by a suitable time delay relay 79a, which is in turn made responsive to closing of contacts 76 as by energization of the main contractor 77, as shown by the dotted line coupling to relay 79a. The time delay is set for a fixed period and closes the contactor. During the time delay period, the motor will have reached full operating speed. Although the switching circuit is of a more or less standard configuration, the polyphase or three phase motor is now connected in the start mode with a full pitch two pole stator winding.

Although not shown as a full pitch winding, the winding is effectively such a winding and functions as a full pitch winding as previously discussed. The inventor has found that the motor rapidly accelerates to full operating speed. The illustrated winding systems are more desirable for providing a somewhat simpler winding procedure and reducing the material in the end turns. The motor functions with the reduced side pull and with a reduced temperature rise because of the effective full pitch and the double delta winding connection.

Although not shown, the winding may be wound as a full pitch lap winding, and further the winding can be wound a lap wound equivalent of the described concentric winding.

Figure 3:
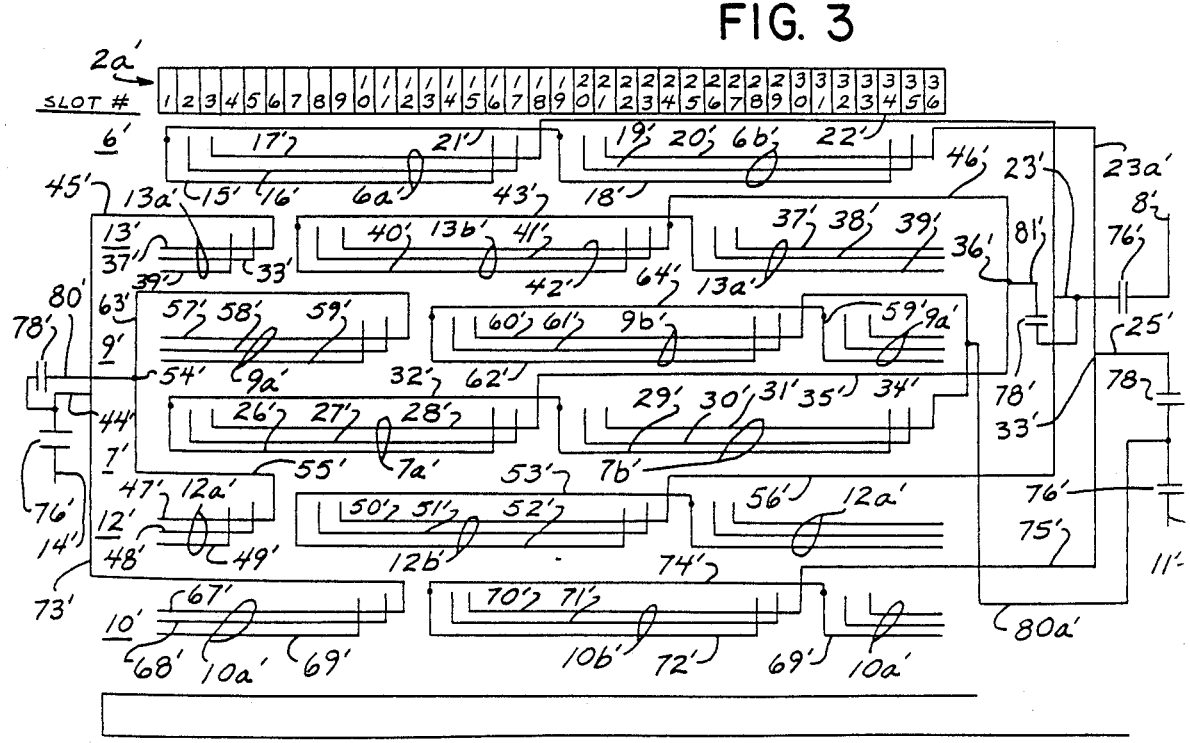
FIG. 3 is a view similar to FIG. 2 illustrating a modified embodiment of the present invention.

For example, if coil unit 6 has the coil group 6a configured or connected with coil sides 1 and 16 connected, with coil sides 2 and 17 connected and with coil sides 3 and 18 connected, the coil group 6a provides a short pitch lap wound winding which functions in the same way as the illustrated embodiment, that is, as a full pitch winding. All of the other coil group would be similarly connected. The internal and line connections would be modified to establish the connections corresponding to that of FIG. 1. The winding slot configuration and connections are shown in FIG. 3. The coil side insertions and the coil connections followed from the previous illustration of FIG. 2 and the coils and connections identified by corresponding primed numbers for simplicity and clarity of illustration.

Further, the illustrated winding configurations provide the highly desirable and optimum configuration. Applicants have found that a slightly shortened pitch can be used but the motor may or may not come up to operating speed under the start connection depending on the application. However, there is a significant dip in the speed-torque characteristic and the size of the dip is directly related to the percentage of the shorter pitch. The slot harmonics appear to create the dip in the curve at four pole speeds and the full pitch winding is preferable. As a practical consideration, the inventors have found that a pitch shortened by more than one slot in the 36 slot configuration created a negative torque. Thus, a short pitch winding as used herein defines a winding which does not create a negative torque.

Although the two coil units for each phase winding are shown separately in FIG. 2, the coils can be simultaneously wound as a single coil such as disclosed in the previously identified patent to Pleiss. The coil units are wound together with appropriate terminals to identify two separate coils for connection as shown in FIGS. 1 and 2.

In summary, the present invention is a simple modification of a double delta two pole winding to use an effective full pitch winding to allow the motor to accelerate to operating speed in the start winding connection while maintaining all of the advantages of the ease of manufacture associated with the effective full pitch winding and the improved performance of the two pole motor operating as a conventional double delta connected winding.

Various modes of carrying out the invention are contemplated as being within the scope of the following claims particularly pointing out and distinctly claiming the subject matter which is regarded as the invention.

We claim:

1. A two pole polyphase dynamoelectric machine, comprising a polyphase multi-layered winding including a separate phase winding for each phase, each phase winding having a pair of series connected coil units wound and connected to form two poles for said phase, each coil unit being wound and connected as essentially an effective full pitch winding, and switch means connected to said windings and having a first state connecting said winding with one coil unit of one phase connected with a coil unit of a different phase in a start connection for starting the dynamoelectric machine and a second state connecting the coil units in each phase in parallel to establish a double delta connection for running of the dynamoelectric machine after said starting, control means actuating the switch means to said first state for establishing said start connection and actuating the switch means to establish said second state, and said coil units being wound as a concentric winding and with the coils of said units wound and connected to function as a full pitch winding.

2. A two pole polyphase dynamoelectric machine, comprising a polyphase multi-layered winding including a separate phase winding for each phase, each phase winding having a pair of series connected coil units wound and connected to form two poles for said phase, each coil unit being wound and connected as essentially an effective full pitch winding, and switch means connected to said windings and having a first state connecting said winding with one coil unit of one phase connected with a coil unit of a different phase in a start connection for starting the dynamoelectric machine and a second state connecting the coil units in each phase in parallel to establish a double delta connection for running of the dynamoelectric machine after said starting, control means actuating the switch means to said first state for establishing said start connection and actuating the switch means to establish said second state, and said coil units being wound as a lap winding and with the coils of said units wound and connected to function as a full pitch winding.

3. A two pole polyphase dynamoelectric machine, comprising a polyphase multi-layered winding including a separate phase winding for each phase, each phase winding having a pair of series connected coil units wound and connected to form two poles for said phase, each coil unit being wound and connected as essentially an effective full pitch winding, and switch means connected to said windings and having a first state connecting said winding with one coil unit of one phase connected with a coil unit of a different phase in a start connection for starting the dynamoelectric machine and a second state connecting the coil units in each phase in parallel to establish a double delta connection for running of the dynamoelectric machine after said starting, control means actuating the switch means to said first state for establishing said start connection and actuating the switch means to establish said second state, and each phase winding includes two coil units having two equal coil groups wound and connected as a two pole field, each of said coil groups being wound as an identical concentric winding with each coils sides in abutting slots and connected to from coils suspending a full pitch.

4. A two-pole polyphase motor, comprising a polyphase multilayered two-pole stator winding including a separate phase winding for each phase, each phase winding including a pair of series connected coil units, said coil units being wound with the coil sides located in spaced slots and interconnected to provide an effective full pitch two-pole winding, said two-pole stator winding being connected in a double delta winding circuit and including means for establishing a series delta circuit connection for starting of the motor and a parallel delta circuit connection for running of the motor after said starting of the motor, and each coil unit includes a coil group consisting of at least three coils and all groups having the same number of coils, each coil group includes coils of identical pitch and wound as a lap winding.

5. A two-pole polyphase motor, comprising a polyphase multilayered two-pole stator winding including a separate phase winding for each phase, each phase winding including a pair of series connected coil units, said coil units being wound with the coil sides located in spaced slots and interconnected to provide an effective full pitch two-pole winding, said two-pole stator winding being connected in a double delta winding circuit and including means for establishing a series delta circuit connection for running of the motor and a parallel delta circuit connection for running of the motor after said starting of the motor, and each coil unit includes a coil group consisting of at least three coils and all groups having the same number of coils, each group of coils includes coils differing in width precisely two slots to define a concentric wound coil unit.

* * * * *

UNITED STATES PATENT AND TRADEMARK OFFICE
CERTIFICATE OF CORRECTION

PATENT NO. : 4,947,072

DATED : August 7, 1990

INVENTOR(S) : William J. Watkins and Randall A. Oyster

It is certified that error appears in the above-identified patent and that said Letters Patent is hereby corrected as shown below:

Col. 10, line 22, delete "from" and substitute therefor ---form---; Col. 10, line 49, delete "running" and substitute therefor ---starting---.

Signed and Sealed this

Seventh Day of January, 1992

Attest:

HARRY F. MANBECK, JR.

*Attesting Officer*  *Commissioner of Patents and Trademarks*